(12) United States Patent
Bakopoulos et al.

(10) Patent No.: US 11,350,189 B2
(45) Date of Patent: May 31, 2022

(54) DYNAMIC ALLOCATION OF NETWORK RESOURCES IN DATACENTERS

(71) Applicant: Mellanox Technologies, Ltd., Yokneam (IL)

(72) Inventors: Paraskevas Bakopoulos, Ilion (GR); Ioannis (Giannis) Patronas, Piraeus (GR); Elad Mentovich, Tel Aviv (IL)

(73) Assignee: Mellanox Technologies, Ltd., Yokneam (IL)

( * ) Notice: Subject to any disclaimer, the term of this patent is extended or adjusted under 35 U.S.C. 154(b) by 0 days.

(21) Appl. No.: 17/066,966

(22) Filed: Oct. 9, 2020

(65) Prior Publication Data
US 2022/0014828 A1 Jan. 13, 2022

(30) Foreign Application Priority Data
Jul. 8, 2020 (GR) .............................. 20200100400

(51) Int. Cl.
*H04Q 11/00* (2006.01)

(52) U.S. Cl.
CPC ..... *H04Q 11/0005* (2013.01); *H04Q 11/0062* (2013.01); *H04Q 2011/0086* (2013.01)

(58) Field of Classification Search
CPC ........................ H04Q 11/0005; H04Q 11/0062
See application file for complete search history.

(56) References Cited

U.S. PATENT DOCUMENTS

| 9,225,454 | B1* | 12/2015 | Liu | .................... | H04J 14/02 |
| 2019/0379477 | A1* | 12/2019 | Tien | .................... | H04J 14/0219 |
| 2020/0236038 | A1* | 7/2020 | Liu | .................... | H04L 41/0836 |
| 2020/0358531 | A1* | 11/2020 | Olson | .................... | H04B 10/40 |

OTHER PUBLICATIONS

Moreolo et al., "Optical Transceiver Technologies for Inter-Data Center Connectivity", ICTON, IEEE, 2014 (Year: 2014).*
Martinez et al., "Control Plane Solutions for Sliceable Bandwidth Transceiver Configuration in Flexi-Grid Optical Networks", IEEE Communications Magazine, Aug. 2016 (Year: 2016).*
(Continued)

*Primary Examiner* — Shi K Li
(74) *Attorney, Agent, or Firm* — Alston & Bird LLP

(57) ABSTRACT

The invention is a datacenter network comprising a plurality of switches. The switches comprise edge switches and aggregation switches associated with sliceable bandwidth variable transceivers (S-BVT). An intermediate passive optical layer is communicatively coupled to the edge switches and the aggregation switches via fiber optic links associated with the S-BVTs. Furthermore, the intermediate passive optical layer is inserted between the edge and aggregation layers in order to combine the signals from each tier. The intermediate passive optical layer comprises a passive fiber coupler that combines the links between switches and each S-BVT receiver receives the signals sent from all S-BVT transmitters connected to the intermediate passive optical layer. The datacenter network is adapted to adjust the local oscillator wavelength of each S-BVT receiver and the wavelength and slice allocation of each S-BVT transmitter, thereby permitting dynamically allocating different resources to each link.

20 Claims, 10 Drawing Sheets

(56) References Cited

OTHER PUBLICATIONS

Prosyk et al., "Travelling Wave Mach-Zehnder Modulators", IPRM2013, IEEE, May 2013 (Year: 2013).*
Imran et al., "A Survey of Optical Carrier Generation Techniques for Terabit Capacity Elastic Optical Networks", IEEE Communications Surveys & Tutorials, vol. X, No. X, Mar. 2017 (Year: 2017).*
Lee et al., "Driver-Integrated 56-GB/s Segmented Electrode Silicon Mach Zehnder Modulator Using Optical-Domain Equalization", OFC 2017, OSA, 2017 (Year: 2017).*
Fabrega et al., "Experimental validation of MTU-BRAS connectivity with DMT transmission and coherent detection in flexgrid metro networks using sliceable transceivers", OFC 2015, OSA, 2015 (Year: 2015).*

* cited by examiner

DYNAMIC ALLOCATION OF NETWORK RESOURCES IN DATACENTERS

CROSS-REFERENCE TO RELATED APPLICATIONS

This application claims priority to Greek Application No. 20200100400, filed Jul. 8, 2020, the content of which is hereby incorporated by reference herein in its entirety.

FIELD OF THE INVENTION

The invention is generally related to the field of optical communication networks. Specifically, the invention relates to dynamic bandwidth allocation in datacenter networks.

BACKGROUND OF THE INVENTION

Current optical datacenter networks are rigid. For example, current optical datacenter networks generally consist of point to point links with fixed bandwidth connecting switches with each other between different tiers in the datacenter architecture. Dynamic bandwidth allocation schemes generally run on top of this rigid optical network infrastructure and generally can only dynamically share the bandwidth of an existing, rigid physical connection.

BRIEF DESCRIPTION OF THE DRAWINGS

Figure 1:
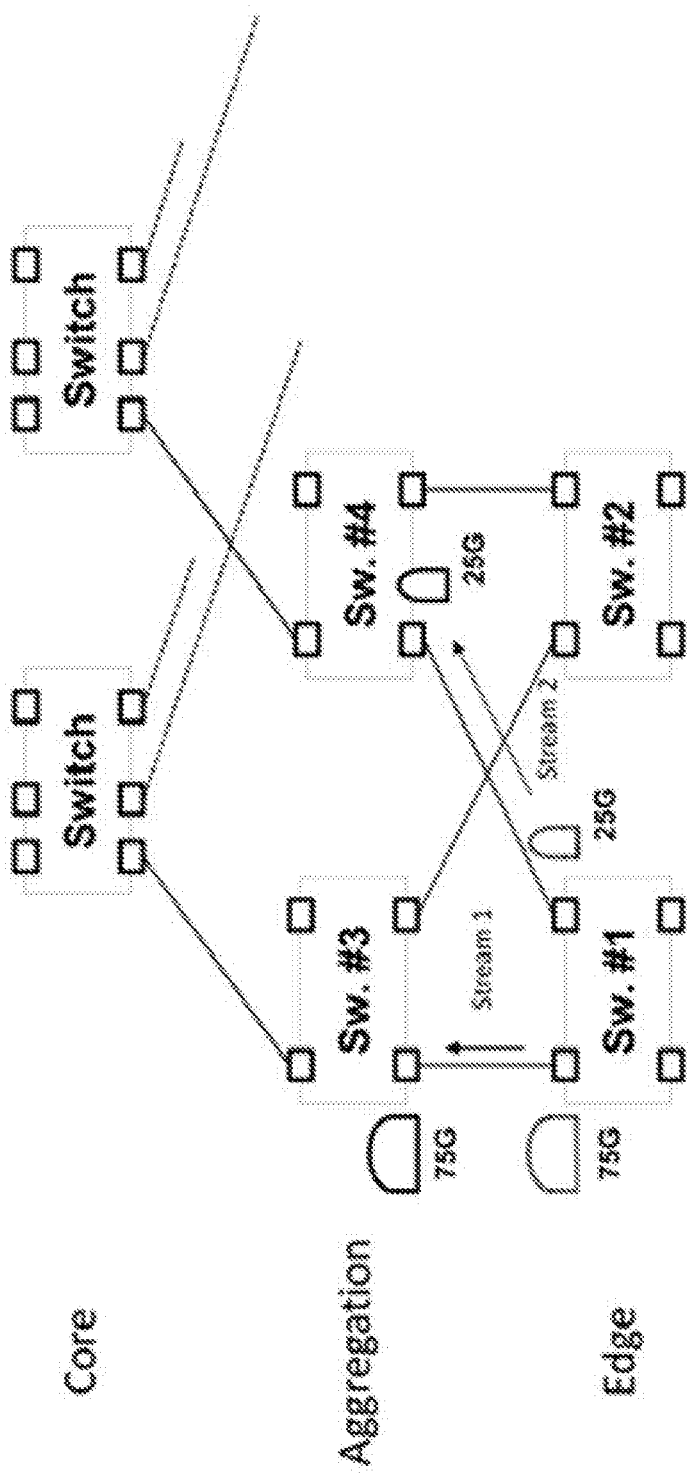
Figure 2A:
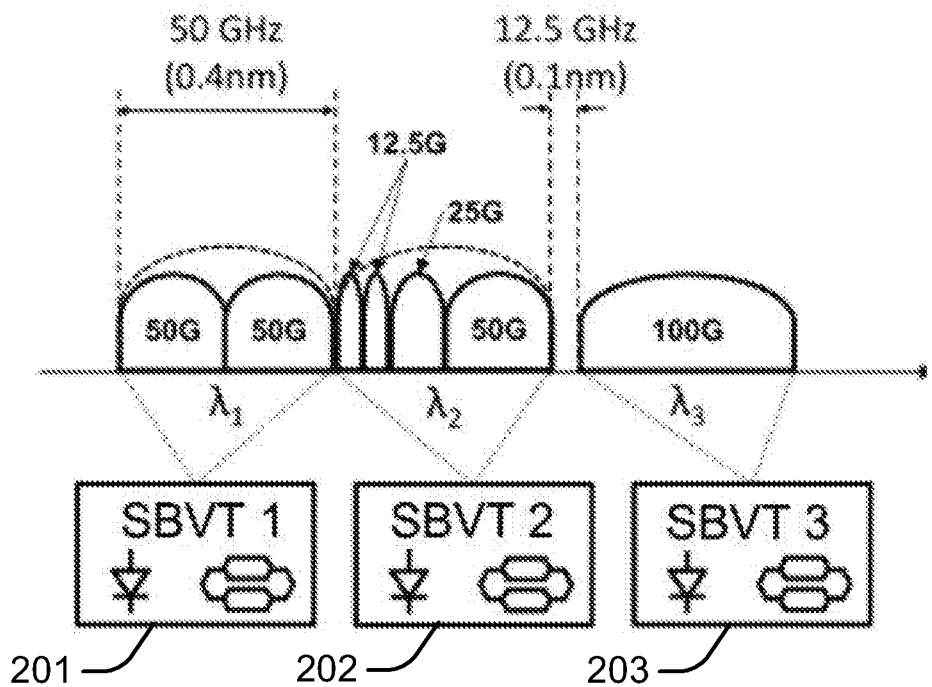
Figure 2B:
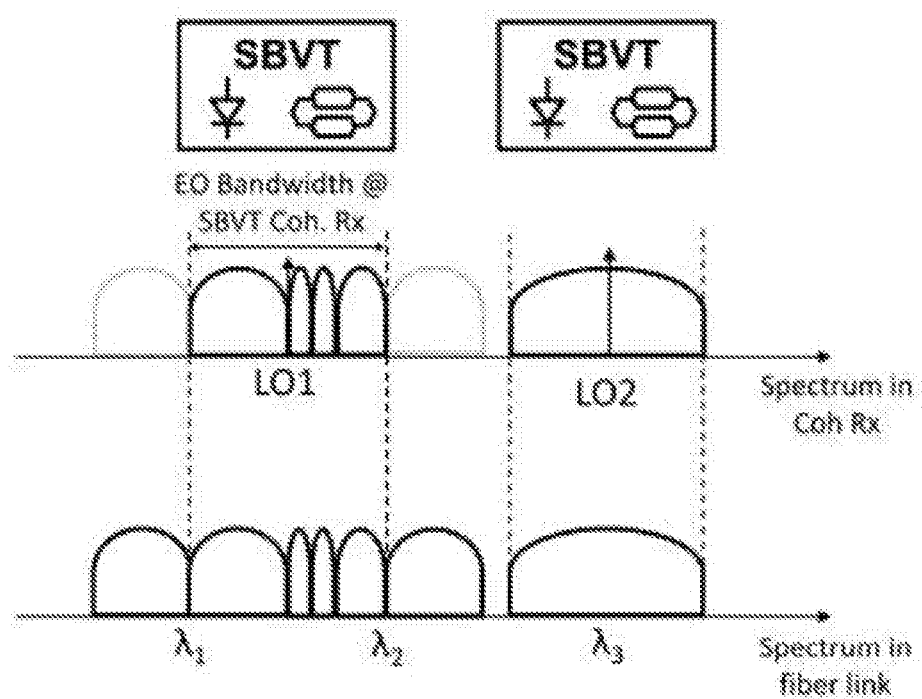

Having thus described the disclosure in general terms, reference will now be made to the accompanying drawings, which are not necessarily drawn to scale, and wherein:

FIG. 1 schematically shows a rigid architecture of a prior art optical datacenter network;

FIG. 2a schematically illustrates one or more exemplary sliceable bandwidth variable transceivers (S-BVTs) that allow for covering a broad optical spectrum, according to one or more embodiments of the present invention;

FIG. 2b illustrates an exemplary S-BVT coherent receiver that is capable of detecting spectral slices that fall within an electro-optical bandwidth of the S-BVT coherent receiver, centered around a wavelength of a local oscillator of the S-BVT coherent receiver, according to one or more embodiments of the present invention where these spectral slices may be transmitted/generated by the same or different transmitters.

Figure 3:
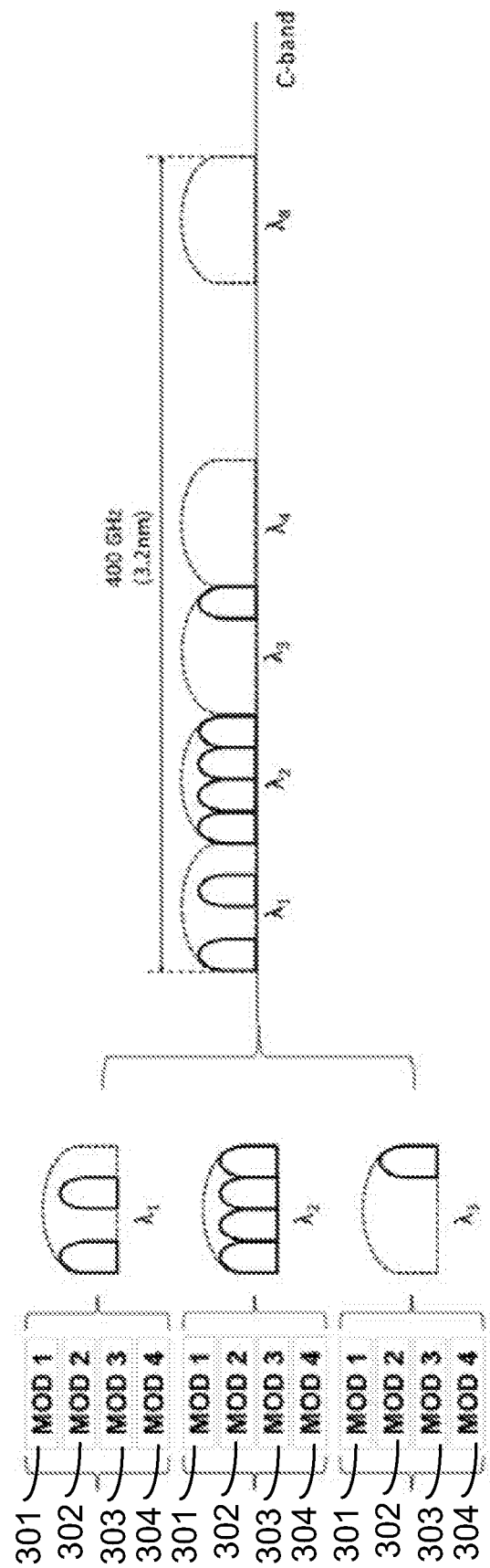
Figure 4A:
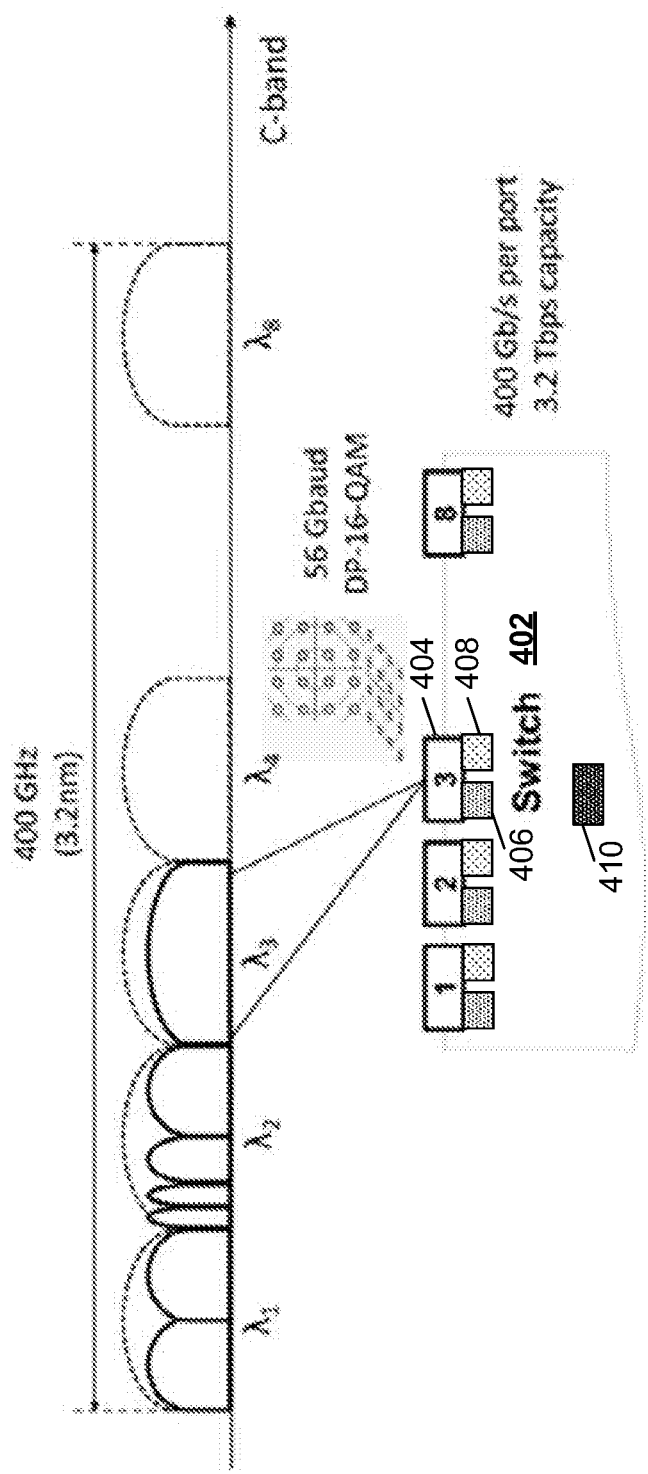
Figure 4B:
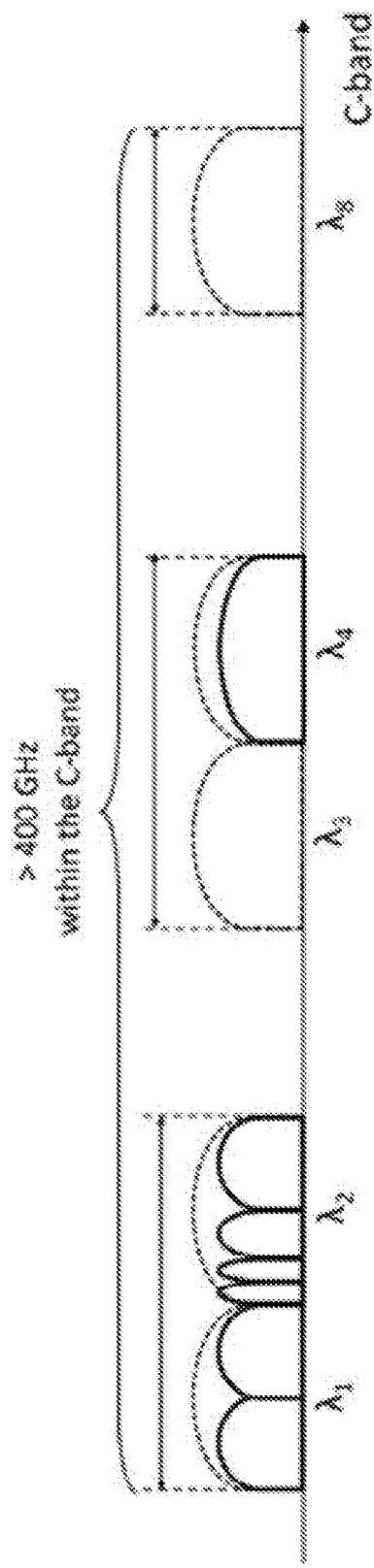
Figure 5:
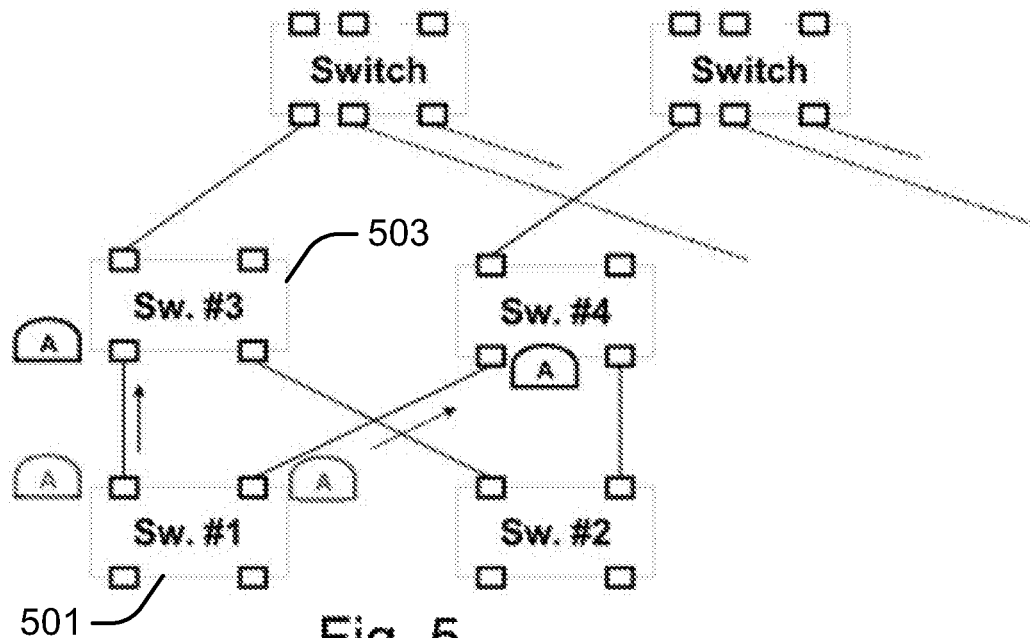
Figure 6:
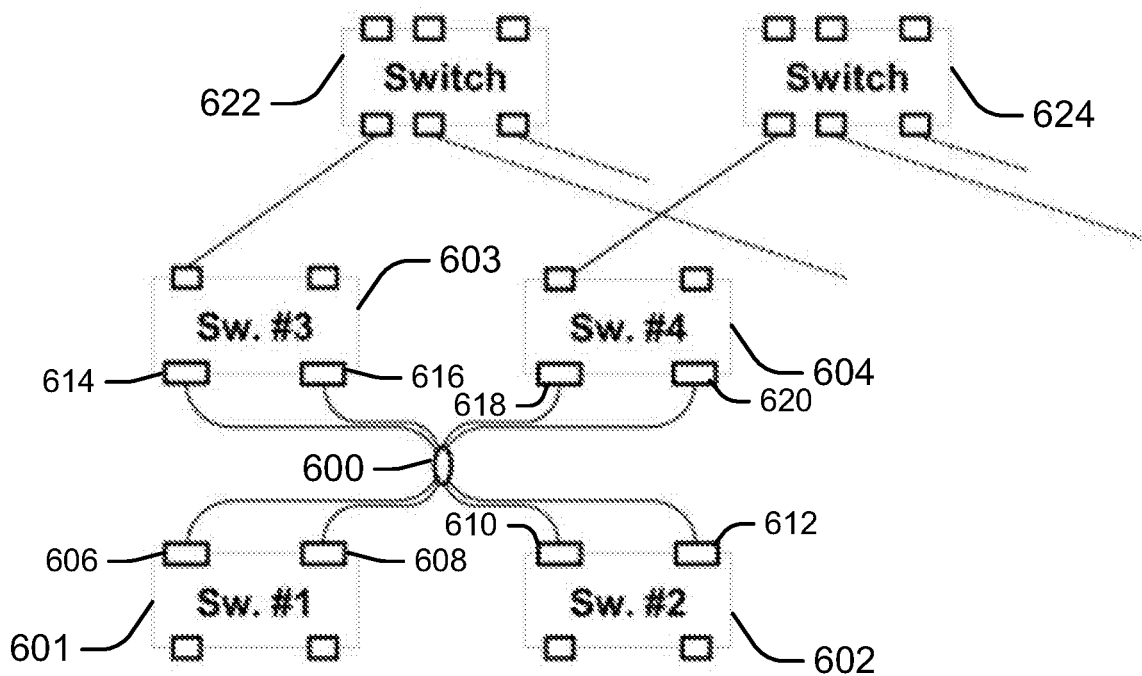
Figure 7A:
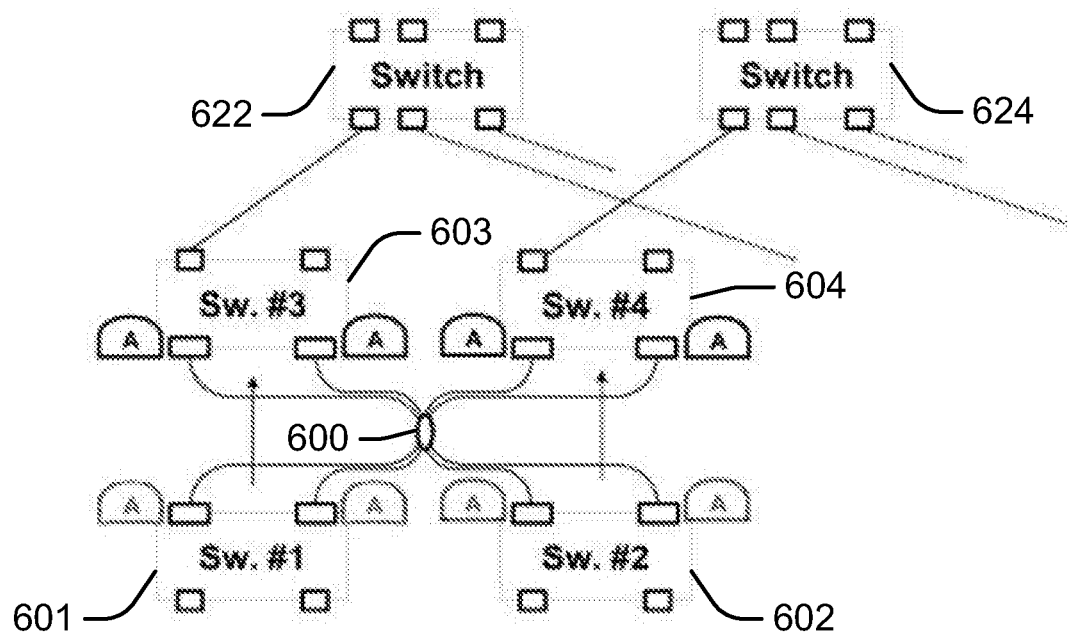
Figure 7B:
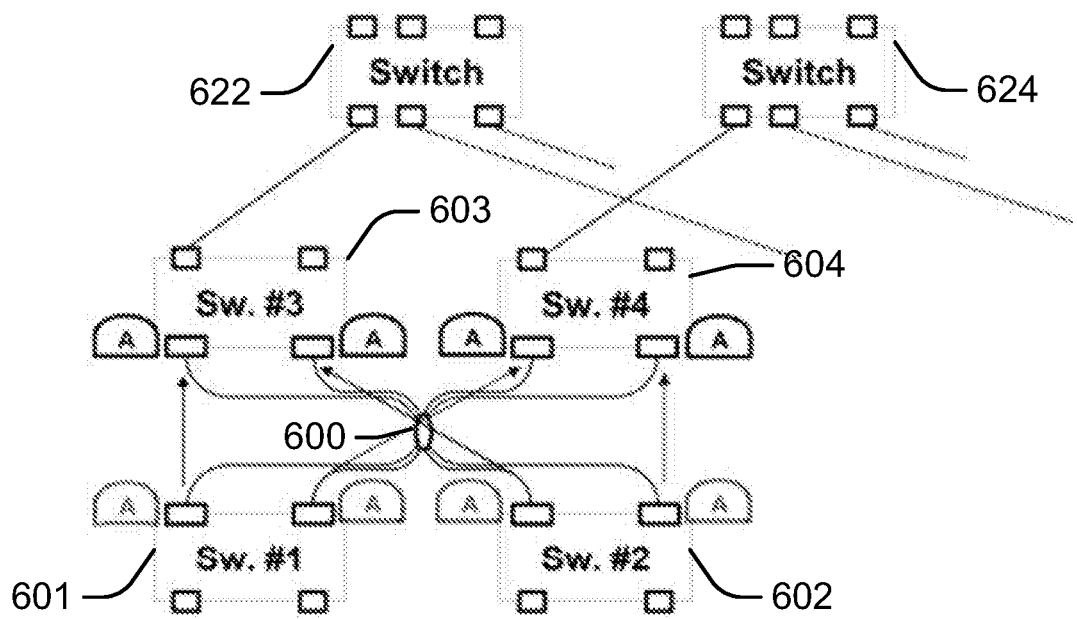
Figure 7C:
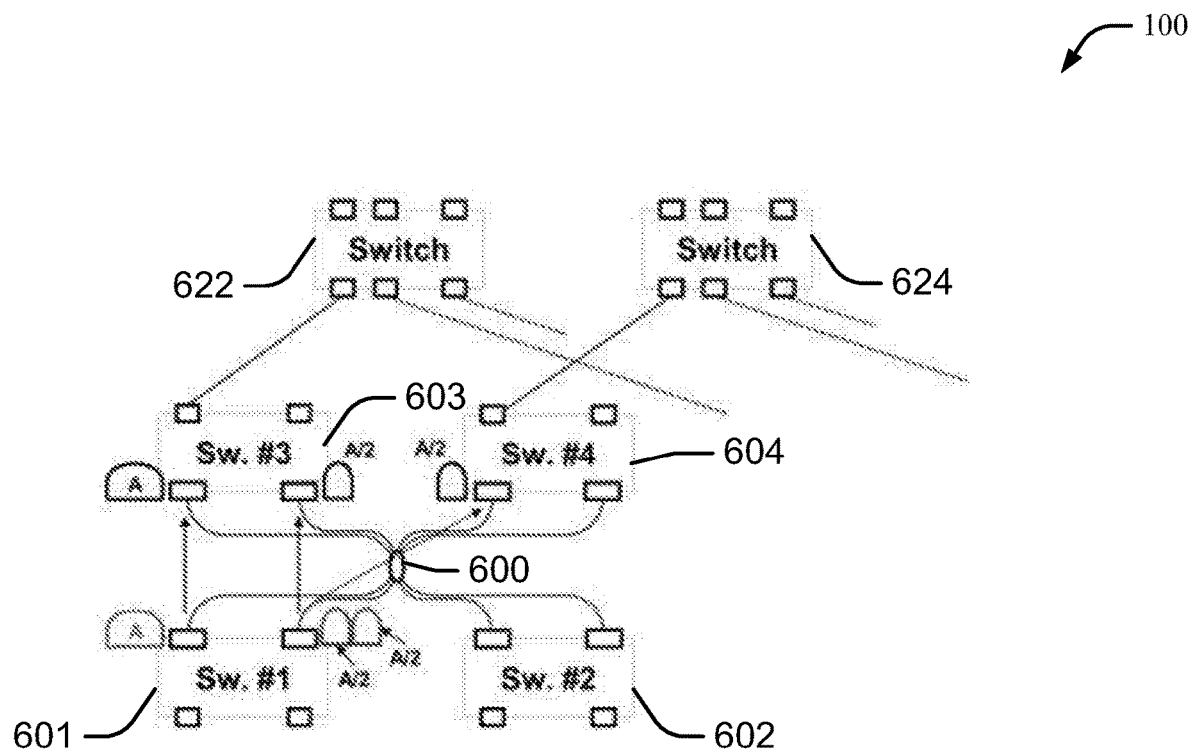
Figure 7D:
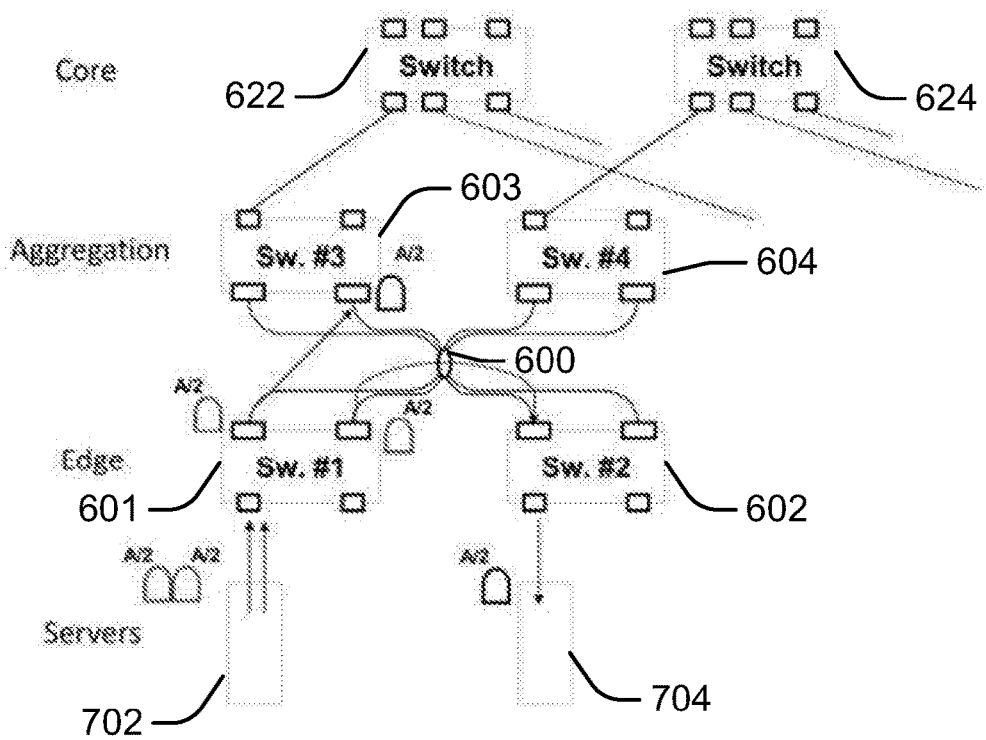
Figure 7E:
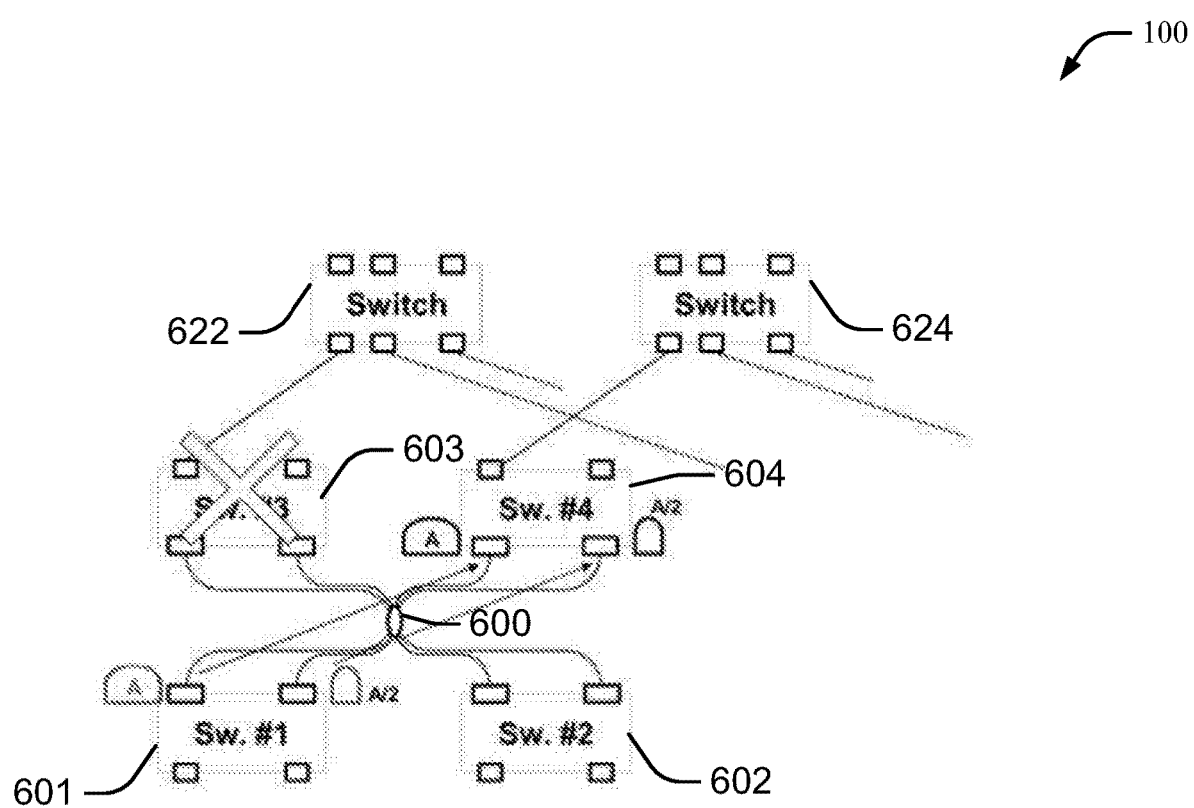
Figure 8:
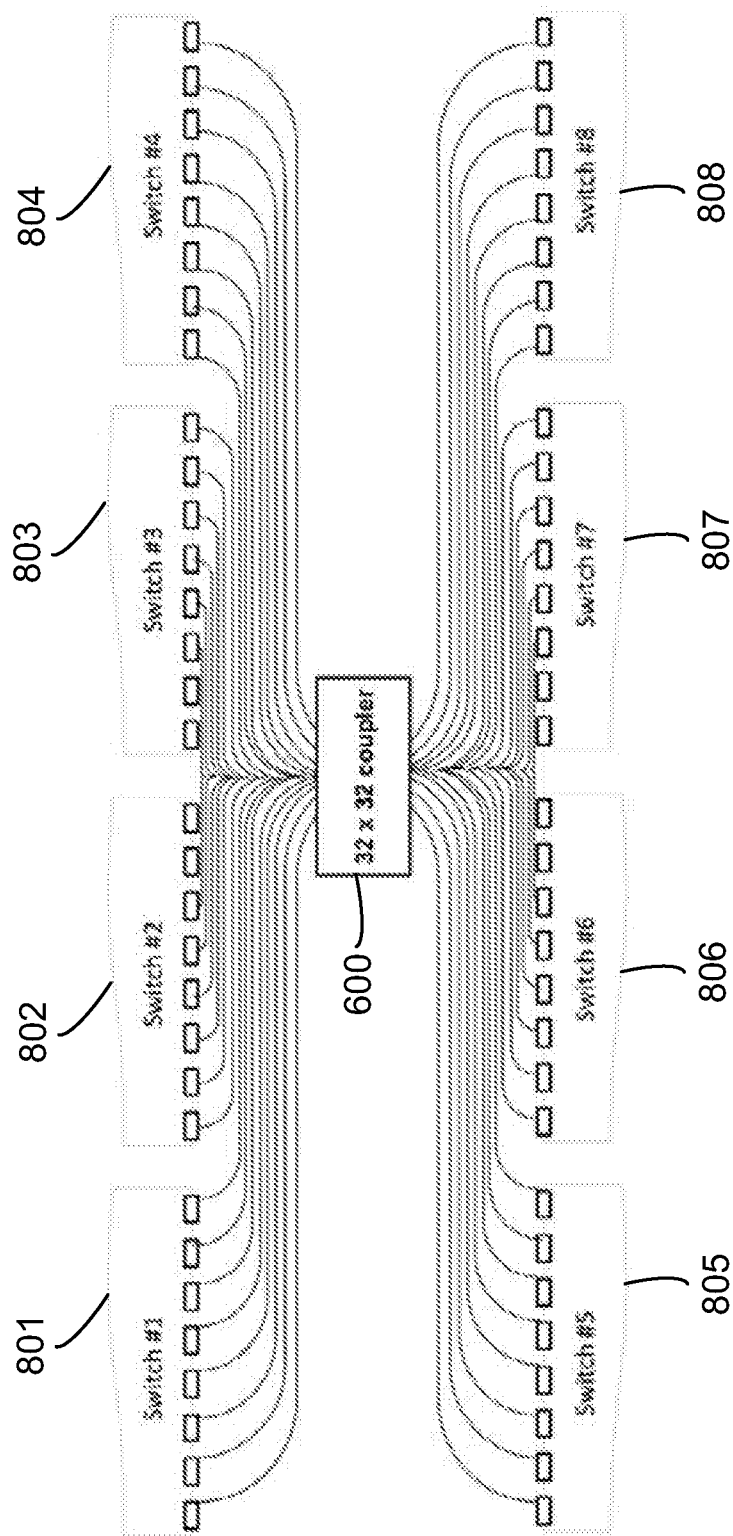

FIG. 3 illustrates an exemplary tunable central wavelength of a comb source feeding several S-BVTs that are combined to cover slices spread across a wavelength band of operation, according to one or more embodiments of the present invention;

FIG. 4a and FIG. 4b illustrate a total capacity of a switch that is distributed contiguously or spread across a C-band depending on a configuration of transceivers, according to one or more embodiments of the present invention;

FIG. 5 schematically shows a typical prior art leaf-spine network architecture;

FIG. 6 schematically illustrates an exemplary fiber coupler that combines signals between switches, according to one or more embodiments of the present invention;

FIG. 7a, FIG. 7b, FIG. 7c, and FIG. 7d illustrate examples of different resources that are dynamically allocated to each link between switches, according to one or more embodiments of the present invention;

FIG. 7e schematically illustrates an exemplary network architecture that provides power savings, according to one or more embodiments of the present invention; and FIG. 8 illustrates an exemplary datacenter architecture that is scaled up to include several ports per switch and several switches per network tier, according to one or more embodiments of the present invention.

DETAILED DESCRIPTION OF EMBODIMENTS OF THE INVENTION

Current optical datacenter networks are rigid. For example, current optical datacenter networks generally consist of point to point links with fixed bandwidth connecting switches with each other between different tiers in the datacenter architecture. Dynamic bandwidth allocation schemes generally run on top of this rigid optical network infrastructure and generally can only dynamically share the bandwidth of an existing, rigid physical connection. For example, in the network shown in FIG. 1 and assuming that each of the links between edge switches and aggregation switches runs at 100 Gb/s, traffic streams 1 and 2 originating from edge switch Sw. #1 (e.g., generated at servers directly connected to a Top of Rack (ToR) switch) and destined for aggregation layer switches Sw. #3 and Sw. #4 may share the total bandwidth of 100 Gb/s (e.g., by allocating 75 Gb/s to stream 1 and 25 Gb/s to stream 2). However, if the optical links connecting switch Sw. #1 with switch Sw. #4 are underutilized or even idle, the associated optical bandwidth cannot be allocated to another connection (e.g., from switch Sw. #1 to switch Sw. #3), and thus resulting the stream 1 operating at a maximum capacity of 100 Gb/s.

A common practice in datacenter networks is oversubscription. The oversubscription technique aims to save network costs by deploying less bandwidth in connections dedicated to higher network tiers. For example, assuming a fat-tree network with total bandwidth of X Tb/s connecting the servers to the ToRs, the total deployed bandwidth connecting the ToRs to the leaf switches is aX Tb/s and the total deployed bandwidth connecting the leaf switches with the spine switches is bX Tb/s, with $1<a<b$ and X being a non-negative number. The oversubscription technique relies on the locality and statistical multiplexing of the traffic, which therefore rarely employs full bisection bandwidth, thus making the deployment of the full bandwidth financially impracticable. However, in the less frequent occasions where multiple connections between a source switch and a destination switch are needed (e.g., when connection hotspots are created), the oversubscribed network generally cannot serve the traffic due to the reduced network resources deployed. Furthermore, the rigid configuration of the oversubscribed network generally does not allocate the bandwidth resources from unused connections to the over-loaded links.

It can be observed that in a typical folded-Clos architecture or leaf-spine architecture, there are multiple paths from a given source to a given destination, at the lowest level of the network. Moreover, multipath routing can cause issues such as out of order delivery and Maximum Transmission Unit (MTU) discovery in Transmission Control Protocol (TCP).

Today, optical links in the datacenter are rigid in a sense that each point-to-point link has a fixed bandwidth that can be used only in a particular point-to-point link. If a point-to-point link is underutilized, the unused bandwidth generally cannot be allocated to another connection, resulting in inefficient use of bandwidth. Dynamic bandwidth allocation is performed at higher network layers and shares the rigid network resources among multiple connections. As a result, and given the extensive use of oversubscription by conventional network systems, it is possible that network bottlenecks may arise in certain connections in a network, whereas network resources may also remain allocated to underutilized links.

Migration to higher capacity interconnects within a datacenter beyond 800G using the current approach of serial transmission using Pulse-Amplitude Modulation (PAM-4) signaling generally involves scaling of the bandwidth of electronics and optics to achieve speeds above 100 Gbaud per lane. In order to cope with increased bandwidth requirements for transceiver hardware, coherent technology currently deployed in metro and core networks can be employed. Coherent transceivers generally employ In-phase and Quadrature (IQ) modulation and polarization multiplexing of a light source, thus quadrupling the degrees of freedom of the modulation space. By employing field modulation rather than intensity, coherent transceivers employ information using time, quadrature, polarization and frequency dimensions. A common type of modulation is single-carrier Polarization-multiplexed (or Dual Polarization) M-ary Quadrature Amplitude Modulation (M-QAM) format. Moreover, by employing Digital Signal Processing (DSP) functionalities, coherent transceivers can generate and detect various types of transmission schemes. For example, a single coherent transceiver can server multiple links by employing a multi-carrier transmission scheme. A coherent transceiver can also provide variable bandwidth (and spectrum) allocation on each link, which can be dynamically adjusted according to the traffic demands. Such coherent transceivers are also known as Sliceable-Bandwidth Variable Transceivers (S-BVT).

Such transceiver topologies are currently used in core/metro optical network topologies in combination with Wavelength Selective Switching (WSS)-based Reconfigurable Optical Add-Drop Multiplexers (ROADMs) in order to, for example, provide aggregation of multiple optical flows. However, it is desirable to achieve further increase of spectrum utilization and efficiency. Furthermore, flexibility in terms of bandwidth shaping and capacity granularity is also desirable.

It is therefore a purpose of the present invention to provide a method for dynamically allocating network resources in the physical layer.

It is a further purpose of the present invention to provide a method for mitigating congested links. In certain embodiments, the present invention provides a method for mitigating congested links in the presence of oversubscription.

Further purposes and advantages of this invention will appear as the description proceeds.

Presented herein is a novel datacenter network architecture that utilizes sliceable bandwidth variable transceivers (S-BVT) to provide dynamic allocation of physical layer resources to different links. In one or more embodiments presented herein, S-BVT technology is transferred from a metro/core network segment to a network inside a datacenter. In various embodiments related to S-BVT technology, spectrum allocation and/or capacity allocation is utilized for improving routing between switches in a datacenter. The datacenter network architecture disclosed herein is adapted to provide various improvements to a datacenter network (e.g., related to cost, performance, and/or efficiency). For example, in one or more embodiments, the datacenter network architecture disclosed herein includes S-BVTs and is implemented without intermediate switching devices (e.g., without WSSs or ROADMs placed in optical node structures known as Colorless, Directionless, Contentionless (C/D/C) nodes, such as in metro optical networks). As such, a need for optical amplifiers as typically used in C/D/C nodes can be alleviated. In various embodiments, simple optical structures (e.g., not complex to manufacture) and/or passive optical structures (e.g., optical couplers and optical splitters and combiners that comprise optical couplers) are employed for interconnections between the S-BVTs to provide increased resiliency and power savings in the datacenter.

In an embodiment, a datacenter network system comprises a plurality of switches and an intermediate passive optical layer. The plurality of switches comprise edge switches and aggregation switches associated with S-BVTs. The intermediate passive optical layer is communicatively coupled to the edge switches and the aggregation switches via fiber optic links associated with the S-BVTs. Furthermore, the intermediate passive optical layer is inserted between the edge switches and the aggregation switches in order to combine signals from different network tiers of a datacenter network.

Now the operation and structure of an S-BVT in a datacenter will be described. The S-BVT is a transceiver capable of generating a multi-carrier optical signal and modulating each carrier with a different data stream so that all traffic from the S-BVT destined for the same receiver is modulated on the same or on adjacent optical carrier, thereby generating spectral "slices". Using one or more S-BVTs allows covering a broad optical spectrum. FIG. 2a shows signal generation of a first S-BVT 201, a second S-BVT 202, and third S-BVT 203. In this case the first S-BVT 201 (e.g., S-BVT 1) is a dual carrier, the second S-BVT 202 (e.g., S-BVT 2) is a 4-carrier, and the third S-BVT 203 (e.g., S-BVT 3) is a single-carrier. At the receiver side, coherent detection is used. Even if the entire spectrum shown in FIG. 2b enters the coherent receiver, it is capable of detecting only a continuous optical spectrum containing the spectral slices that fall within its electro-optical bandwidth, centered around the wavelength of the Local Oscillator (LO).

In an embodiment related to a datacenter S-BVT transmitter, an IQ modulator is driven by a Digital-to-Analog Converter (DAC). In this embodiment, the high-speed data streams (e.g., at the output of the Physical Medium Attachment (PMA) of Ethernet stack) are fed to a Digital Signal Processing (DSP) Application-Specific Integrated Circuit (ASIC). In various embodiments, the ASIC is equipped with a 4-channel DAC stage at an output stage of the ASIC. The 4-channel DAC stage can be capable of generating one or more analog signals with multiple bits vertical resolution. In some embodiments, the one or more analog signals are the in-phase and quadrature components for the IQ modulator. In some embodiments, four analog signals are fed into a dual polarization IQ modulator. In some embodiments, the IQ modulator of each polarization can be implemented using a Dual-Nested Travelling-Wave Mach-Zehnder Modulator or another type of modulator. In some embodiments, the transmitter employs an external laser source (e.g., a Distributed Feedback (DFB) or an External Cavity Laser (ECL)). The horizontally-polarized Continuous Wave (CW) from the laser is split, in certain embodiments, by a 50-50 coupler to feed the two IQ modulators. In various embodiments, the output optical signal of the first modulator is rotated by 90 degrees (e.g., by means of a polarization rotator) to achieve a vertically-polarized output. The two outputs are recombined, in various embodiments, using a second 50-50 coupler, thus achieving a polarization-multiplexed signal.

In some embodiments, instead of generating the spectral slices at the DAC after Fourier processing, a comb source is utilized to generate multiple carriers. Each of the multiple carriers can be modulated in a separate modulator (e.g., intensity and/or phase) to generate a multi-carrier signal. In various embodiments, sets of modulated carriers that are aimed to the same destination can form a spectral slice. In various embodiments, the comb source feeding each S-BVT can include a tunable central wavelength so that their combination can cover slices spread across the wavelength band of operation. This is schematically illustrated in FIG. 3. In an embodiment illustrated in FIG. 3, a first modulator 301, a second modulator 302, a third modulator 303 and/or a fourth modulator 304 can be employed.

In another embodiment related to an IQ Segmented-electrode Mach-Zehnder modulator driven by a digital core/ASIC, a segmented-electrode IQ Mach-Zehnder modulator can replace a DAC-based optical transmitter. In this embodiment, the digital core/ASIC is the main integrated circuit of the switch, which inter alia is responsible for transmitting and receiving the digital information to and from the transceivers. As such, the DAC can be eliminated since the multi-level (and possibly multi-carrier) signal generation is done in the optical domain. Furthermore, the Dual-Nested configuration of the Mach-Zehnder modulators is maintained while the single electrode of each Mach-Zehnder structure is divided into multiple shorter ones. In various embodiments, each of the electrodes is driven by a digital electrical signal (e.g., a binary signal) provided by the digital core. By adjusting the length of each electrode, the interference at the output of the modulator can be controlled, resulting in an optical signal with multiple power levels. In various embodiments, the number of the electrodes on the segmented modulator can define the output signal level resolution. For example, a larger number of electrodes can correspond to a higher resolution. Transferring the multi-level and/or multi-carrier generation capabilities from the electrical to the optical domain reduces the overall power consumption of the transmitter since the DAC and the high-speed linear driving electronics are replaced by digital Non-Return-To-Zero (NRZ) drivers.

In various embodiments, multiple transmitters (e.g., a transmitter bank) are attached to the ports of a switch 402 oriented towards a corresponding tier of the network, as shown in FIG. 4a and FIG. 4b. In an embodiment, a transmitter 406 can be attached to a port 404 of the switch 402. Additionally, a receiver 408 can be attached to the port 404 of the switch 402. In certain embodiments, the transmitter 406 and the receiver 408 can correspond to a transceiver. In an embodiment, the transmitter 406 can be an S-BVT transmitter and the receiver 408 can be an S-BVT receiver. Other ports of the switch 402 can also be attached to a transmitter and/or a receiver. The center wavelength of each transmitter is tunable and can be selected in such a way so that the overall spectrum generated from the transmitter bank can cover select slices of the system's operating band. For example, assume that the system operates in the C-band (1530-1565 nm) and eight 400 Gb/s switch ports are connected to the higher network tier through the disclosed transmitter bank. Each S-BVT transmitter generates up to 400 Gb/s of traffic by modulating its spectral slices with DP-16QAM modulation (at 53-64 Gbaud—depending on the FEC of the system), consuming 50 GHz of optical bandwidth, independently of how the subcarriers/slices are organized within the 50 GHz slot. The total capacity of the switch is 8×400 Gb/s=3.2 Tb/s and the total optical bandwidth consumed is 400 GHz (3.2 nm). This is schematically shown in FIG. 4a. This 400 GHz optical bandwidth can be contiguous or spread across the C-band depending on the configuration of the transceivers (e.g., depending on the set central wavelength and the programmed spectral slices per transmitter). This is shown schematically in FIG. 4b.

In various embodiments, the S-BVT receiver is a coherent receiver. In an embodiment, the S-BVT receiver can be an optical coherent receiver. For example, the S-BVT receiver can be configured according to an Optical Internetworking Forum (OIF) implementation. In certain embodiments, the S-BVT receiver can include a local oscillator, one or more analog-to-digital converters, and/or a digital signal processing unit. Similar to the transmit side and in order to provide symmetric bandwidth to the switch, a receiver bank can be employed. By adjusting the Local Oscillator (LO) wavelength of each receiver S-BVT, a designated set of spectral regions can be received by the S-BVT receiver.

In certain embodiments, each S-BVT transmitter is comprised of multiple external lasers having tunable central wavelengths that are selected such that an overall spectrum generated by an S-BVT transmitter from the S-BVT transmitters covers select slices of an operating band of the datacenter network. In certain embodiments, an external laser from the multiple external lasers is a comb source having a tunable central wavelength which generates multiple carriers. Intensity and/or phase of each of the carriers can be modulated by a separate modulator to generate a multi-carrier signal. Furthermore, in an embodiment, sets of the modulated carriers can be aimed toward a same destination to form a spectral slice.

In certain embodiments, the switch 402 can additionally include a control plane processor 410. The control plane processor 410 can be adapted to adjust a local oscillator wavelength of one or more S-BVT receivers and a wavelength and slice allocation of one or more S-BVT transmitters, thereby permitting dynamic allocation of different resources to each link of the links. In an embodiment, the control plane processor 410 can be adapted to perform the wavelength and slot assignment on each S-BVT transmitter. Furthermore, the control plane processor 410 can be adapted to set a number of sub-carriers, a bandwidth of each sub-carrier, and a center wavelength of each S-BVT transmitter. As such, the control plane processor 410 can facilitate and/or provide in-band management or out-of-band management of the datacenter network.

FIG. 5 schematically shows a typical prior art leaf-spine network architecture. The edge switches are connected to the aggregation switches through fixed bandwidth connections. In the example shown in FIG. 5, two transceivers are attached to the respective ports of each switch. If the bandwidth per link is A Gb/s, then a first switch 501 (e.g., Sw. #1) can only communicate with a third switch (e.g., Sw. #3) through an up to A Gb/s link.

In the architecture proposed herein, the fixed wavelength transceivers are replaced with S-BVTs and all signals are combined using a fiber coupler 600, as schematically shown in FIG. 6. For instance, the fiber coupler 600 can combine signals provided by a first switch 601 (e.g., Sw. #1), a second switch 602 (e.g., Sw. #2), a third switch 603 (e.g., Sw. #3), and a fourth switch 604 (e.g., Sw. #4). The fiber coupler 600 can be, for example, an optical coupler. For example, the fiber coupler 600 can be an intermediate passive optical layer. The first switch 601 (e.g., Sw. #1) and the second switch 602 (e.g., Sw. #2) can be edge switches in an edge layer (e.g., an edge network tier) of the datacenter network. Furthermore, the third switch 603 (e.g., Sw. #3) and the fourth switch 604 (e.g., Sw. #4) can be aggregation switches in an aggregation layer (e.g., an aggregation network tier) of the datacenter network. In an embodiment, the fiber coupler can combine signals provided by an S-BVT 606 and/or an S-BVT 608 of the first switch 601 (e.g., Sw. #1), signals provided by an S-BVT 610 and/or an S-BVT 612 of the second switch 602 (e.g., Sw. #2), signals provided by an S-BVT 614 and/or an S-BVT 616 of the third switch 603 (e.g., Sw. #3), and signals provided by an S-BVT 618 and/or an S-BVT 620 of the fourth switch 604 (e.g., Sw. #4). The S-BVT 606, the S-BVT 608, the S-BVT 610, the S-BVT 612, the S-BVT 614, the S-BVT 616, the S-BVT 618, and the S-BVT 620 can be physically and/or communicatively coupled to the fiber coupler 600 via respective communication links (e.g., respective fiber optic links, respective fiber optic communication channels, respective fiber optic cables etc.). In this way, each receiver connected to the fiber coupler 600 receives the signals sent from all transmitters connected to the fiber coupler 600. By adjusting the LO wavelength of each receiver as well as the wavelength and slice allocation of each transmitter, it is possible to dynamically allocate different resources to each link. In certain embodiments, the datacenter network can additionally include a switch 622 and/or a switch 624. The switch 622 and/or the switch 624 can be, for example, core switches in a core layer (e.g., a core network tier) of the datacenter network.

The fiber coupler 600 can include optical connector interfaces (e.g., LC optical fiber connector interfaces, FC optical fiber connector interfaces, etc.). The optical connector interfaces of the fiber coupler 600 can, for example, connect to optical input/output of respective transceivers. In an embodiment, the fiber coupler 600 can be a passive device that mixes optical power of inputs. For example, the fiber coupler 600 can distribute optical power of inputs of the fiber coupler 600 to respective outputs of the fiber coupler 600. As such, in certain embodiments, the fiber coupler 600 can operate as an optical power distributor. In an aspect, each output port of the fiber coupler 600 can contain a sum of every input optical flow. In certain embodiments, a control plane processor associated with an S-BVT can manage routing of data flows. For example, a control plane processor associated with an S-BVT can configure operating wavelength and/or a spectral window for respective S-BVT transmitters and/or respective S-BVT receivers.

FIG. 7a shows routing of all traffic from the first switch 601 (e.g., Sw. #1) to the third switch 603 (e.g., Sw. #3) via the fiber coupler 600, and all traffic from the second switch 602 (e.g., Sw. #2) to the fourth switch 604 (e.g., Sw. #4) via the fiber coupler 600. Each connection carries 2 A Gb/s, which is twice the traffic achievable in the conventional "rigid" network configuration shown in FIG. 5.

FIG. 7b shows routing of A Gb/s from the first switch 601 (e.g., Sw. #1) to the fourth switch 604 (e.g., Sw. #4) via the fiber coupler 600, A Gb/s from the first switch 601 (e.g., Sw. #1) to the third switch 603 (e.g., Sw. #3) via the fiber coupler 600, A G/s from the second switch 602 (e.g., Sw. #2) to the fourth switch 604 (e.g., Sw. #4) via the fiber coupler 600, and A Gb/s from the second switch 602 (e.g., Sw. #2) to the third switch 603 (e.g., Sw. #3) via the fiber coupler 600. As such, improved throughput in a network configuration of switches can be provided.

FIG. 7c shows an embodiment where the first switch 601 (e.g., Sw. #1) maintains a low bandwidth connection to the fourth switch 604 (e.g., Sw. #4), at A/2 Gb/s. In the conventional approach shown in FIG. 5, the link from the first switch 601 (e.g., Sw. #1) to the third switch 603 (e.g., Sw. #3) can only use A Gb/s whereas the remaining A/2 Gb/s of the adjacent link cannot be used and is therefore wasted. In the disclosed approach (e.g., as shown in FIG. 7d), the remaining A/2 Gb/s of the second switch 602 (e.g., Sw. #2)/fourth switch 604 (e.g., Sw. #4) link are allocated to the first switch 601 (e.g., Sw. #1)/third switch 603 (e.g., Sw. #3) link, achieving a maximum bandwidth 3A/2 Gb/s for the first switch 601 (e.g., Sw. #1)/third switch 603 (e.g., Sw. #3) link.

FIG. 7d shows an embodiment in which the proposed architecture reduces the oversubscription of the network topology. Two servers (e.g., server 702 and server 704) can communicate directly at the edge layer since the first switch 601 (e.g., Sw. #1) and the second switch 602 (e.g., Sw. #2) are also connected with each other through the fiber coupler 600. As such, the first switch 601 (e.g., Sw. #1) and the second switch 602 (e.g., Sw. #2) can be in communication without employing the aggregation layer, thus reducing bandwidth for one or more network tiers of the leaf-spine network.

In various embodiments, the proposed datacenter architecture can scale to more than two ports and two switches per network tier. With reference to the example in a previous paragraph where each switch is equipped with eight S-BVTs providing 3.2 Tb/s of traffic and covering 400 GHz (3.2 nm), and assuming eight switches interconnected with each other, the total optical operating band is 8×400 GHz=3.2 THz (25.6 nm, a subset of the C-band) and the total optical losses for combining the multiple signals in the coupler are 18 dB, which is within the typical loss budget of a coherent receiver. Scaling is shown schematically in FIG. 8 where the fiber coupler 600 can be a 32×32 coupler. The fiber coupler 600 shown in FIG. 8 can be coupled to a first switch 801 (e.g., Switch #1), a second switch 802 (e.g., Switch #2), a third switch 803 (e.g., Switch #3), and/or a fourth switch 804 (e.g., Switch #4) in an edge layer (e.g., an edge network tier) of the datacenter network. Additionally, the fiber coupler 600 shown in FIG. 8 can be coupled to a fifth switch 805 (e.g., Switch #5), a sixth switch 806 (e.g., Switch #6), a seventh switch 807 (e.g., Switch #7), and/or an eighth switch 808 (e.g., Switch #8) in an aggregation layer (e.g., an aggregation network tier) of the datacenter network. In an embodiment, the first switch 801 (e.g., Switch #1), the second switch 802 (e.g., Switch #2), the third switch 803 (e.g., Switch #3), the fourth switch 804 (e.g., Switch #4), the fifth switch 805 (e.g., Switch #5), the sixth switch 806 (e.g., Switch #6), the seventh switch 807 (e.g., Switch #7), and/or the eighth switch 808 (e.g., Switch #8) can include more than two S-BVTs physically and/or communicatively coupled to the 32×32 coupler.

As mentioned above, in the proposed architecture the fiber coupler 600 (e.g., an intermediate passive optical layer) is inserted between the edge layer (e.g., an edge layer that includes edge switches) and aggregation layer (e.g., an aggregation layer that includes aggregation switches) in order to combine the signals from different network tiers.

In various embodiments, physical layer resources can be re-allocated among different links. As a result, it is possible to avoid a particular link in the network, by allocating zero bandwidth to the associated links. This can be particularly useful in case of equipment failures and/or power savings for the network.

With reference again to FIGS. 7a-7d, in a case of failure of the fourth switch 604 (e.g., Sw. #4), the first switch 601 (e.g., Sw. #1) and the second switch 602 (e.g., Sw. #2) can still communicate with the third switch 603 (e.g., Sw. #3) with a total bandwidth of 2 A. This bandwidth can be shared dynamically between the two connections between first switch 601 (e.g., Sw. #1)/third switch 603 (e.g., Sw. #3) and second switch 602 (e.g., Sw. #2)/third switch 603 (e.g., Sw. #3).

In an embodiment related to low network load, connections can be adjusted in a way so as to skip one or more switches in the network. For example, with reference to FIG. 7e, if the total bandwidth of the active links is <2 A, it is possible to temporarily power down the third switch 603 (e.g., Sw. #3) and route all traffic through the fourth switch 604 (e.g., Sw. #4). In this regard, turning off electrical switches can save a significant part of the network power.

In various embodiments, the wavelength and slot assignment on each S-BVT can be performed by a control plane which can operate either in-band or out-of-band with a low-speed, low capacity network. The control plane is responsible for setting the proper spectrum shape (e.g., the number of sub-carriers and bandwidth of each subcarrier) and/or the center wavelength of each S-BVT. Proper configuration ensures maximizing the spectrum utilization while avoiding fragmentation and collisions on the communication between the S-BVTs.

The use of S-BVTs in the datacenter architecture as described herein enables multicasting in the physical layer. In case a traffic flow needs to be duplicated and serves two or more different links, multicasting can be achieved by adjustment of the LO of multiple receivers of the S-BVTs on the topology.

The use of S-BVTs in the datacenter architecture as described herein provides several advantages over the rigid architecture of the prior art. Amongst these advantages are better network utilization (e.g., because the physical layer resources of unused links can be used to support over-utilized active links) and/or mitigation of bottlenecks due to oversubscription (e.g., even in oversubscribed networks specific links can be supported with extra bandwidth in case of traffic peaks, well exceeding their nominal bandwidth). Furthermore, the physical layer based resource allocation scheme can provide the same advantages as multipath routing without the accompanying issues. Furthermore, network reconfiguration in the physical layer (e.g., by allocating resources appropriately in the physical layer, particular links can be configured to be inactive such that no bandwidth is allocated to them). As such, improved resilience of a network can be provided (e.g., by inactivating links to malfunctioning devices) and/or reduce power consumption can be provided (e.g., by inactivating links associated to a particular network device to powering down the network device and provide power savings).

Although embodiments of the invention have been described by way of illustration, it will be understood that the invention may be carried out with many variations, modifications, and adaptations, without exceeding the scope of the claims.

The invention claimed is:

1. A datacenter network system, comprising:
a plurality of switches that comprise edge switches and aggregation switches associated with sliceable bandwidth variable transceivers (S-BVT); and
an intermediate passive optical layer that is communicatively coupled to the edge switches and the aggregation switches via fiber optic links associated with the S-BVTs, wherein the intermediate passive optical layer is disposed between the edge switches and the aggregation switches, wherein the intermediate passive optical layer comprises a fiber coupler distinct from the plurality of switches, and wherein the fiber coupler of the intermediate passive optical layer is configured to combine signals associated with the fiber optic links from different network tiers of a datacenter network.

2. The datacenter network system according to claim 1, wherein the intermediate passive optical layer comprises a corresponding number of inputs and outputs associated with the fiber optic links.

3. The datacenter network system according to claim 1, wherein the plurality of switches further comprises S-BVT receivers that receive signals sent from S-BVT transmitters connected to the intermediate passive optical layer.

4. The datacenter network system according to claim 1, wherein the S-BVTs are associated with a control plane processor adapted to adjust a local oscillator wavelength of one or more S-BVT receivers and a wavelength and slice allocation of one or more S-BVT transmitters, thereby permitting dynamic allocation of different resources to each fiber optic link of the fiber optic links.

5. The datacenter network system according to claim 4, wherein the control plane processor is adapted to perform the wavelength and slot assignment on each S-BVT transmitter and is responsible for setting a number of sub-carriers, a bandwidth of each sub-carrier, and a center wavelength of each S-BVT transmitter.

6. The datacenter network system according to claim 5, wherein the control plane processor provides in-band management or out-of-band management of the datacenter network.

7. The datacenter network system according to claim 4, wherein the control plane processor is configured to set a center wavelength, a slot assignment, a number of sub-carriers, and a bandwidth of each sub-carrier of each S-BVT transmitter.

8. The datacenter network system according to claim 1, wherein the plurality of switches further comprises S-BVT transmitters attached to ports of switches of the plurality of switches facing towards a corresponding tier of the datacenter network, and wherein each S-BVT transmitter is comprised of multiple external lasers having tunable central wavelengths that are selected such that an overall spectrum generated by an S-BVT transmitter from the S-BVT transmitters covers select slices of an operating band of the datacenter network.

9. The datacenter network system according to claim 8, wherein the S-BVT transmitters are embodied as an In-phase and Quadrature (IQ) modulator driven by a Digital to Analog Converter (DAC) comprising a Digital Signal Processing Application-Specific Integrated Circuit (DSP ASIC) equipped with a 4-channel Digital to Analog Converter (DAC) stage configured to generate analog signals with multiple bit vertical resolution, and wherein the analog signals are in-phase and quadrature components that are fed into a dual polarization IQ modulator.

10. The datacenter network system according to claim 9, wherein the dual polarization IQ modulator is a Dual-Nested Travelling-Wave Mach-Zehnder Modulator.

11. The datacenter network system according to claim 8, wherein an external laser from the multiple external lasers is a comb source having a tunable central wavelength which generates multiple carriers, wherein intensity and/or phase of each of the carriers is modulated by a separate modulator to generate a multi-carrier signal, and wherein sets of the modulated carriers that are aimed toward a same destination to form a spectral slice.

12. The datacenter network system according to claim 8, wherein the S-BVT transmitters are embodied as an IQ segmented-electrode Mach-Zehnder modulator driven by a digital core.

13. The datacenter network system according to claim 1, wherein the plurality of switches further comprises S-BVT receivers attached to ports of switches of the plurality of switches, and wherein each S-BVT receiver comprises a set of multiple receivers each of which is configured such that respective local oscillators are adjusted such that the S-BVT receiver receives a designated set of spectral regions.

14. The datacenter network system according to claim 1, wherein physical layer resources are re-allocated among different fiber optic links such that, in case of low network load, connections are adjusted to skip one or more switches in the datacenter network by allocating zero bandwidth to associated fiber optic links.

15. The datacenter network system according to claim 1, wherein the intermediate passive optical layer is configured to mix optical power of inputs to the intermediate passive optical layer with respective outputs of the intermediate passive optical layer.

16. A network system, comprising:
a plurality of switches that comprise edge switches and aggregation switches associated with sliceable bandwidth variable transceivers (S-BVT); and
a fiber coupler that is communicatively coupled to the edge switches and the aggregation switches via fiber optic links associated with the S-BVTs, wherein the fiber coupler is distinct from the plurality of switches and is disposed between the edge switches and the aggregation switches, and wherein the fiber coupler combines signals associated with the fiber optic links from different network tiers of a network.

17. The network system according to claim 16, wherein physical layer resources are re-allocated among different fiber optic links such that, in case of low network load, connections are adjusted to skip one or more switches in the datacenter network by allocating zero bandwidth to associated fiber optic links.

18. The network system according to claim 16, wherein the fiber coupler comprises a corresponding number of inputs and outputs associated with the fiber optic links.

19. The network system according to claim 16, wherein the plurality of switches further comprises S-BVT receivers that receive signals sent from S-BVT transmitters connected to the fiber coupler.

20. The network system according to claim 16, wherein the fiber coupler is configured to mix optical power of inputs with the fiber coupler to respective outputs of the fiber coupler.

* * * * *

UNITED STATES PATENT AND TRADEMARK OFFICE
CERTIFICATE OF CORRECTION

| | | |
|---|---|---|
| PATENT NO. | : 11,350,189 B2 | |
| APPLICATION NO. | : 17/066966 | |
| DATED | : May 31, 2022 | |
| INVENTOR(S) | : Paraskevas Bakopoulos et al. | |

It is certified that error appears in the above-identified patent and that said Letters Patent is hereby corrected as shown below:

On the Title Page

Under Item (72), please add -- Nikos Argyris, Zografou (GR); Dimitrios Kalavrouziotis, Papagou (GR) --

Signed and Sealed this
Twenty-fifth Day of October, 2022

Katherine Kelly Vidal
*Director of the United States Patent and Trademark Office*